(12) United States Patent
Fukumoto et al.

(10) Patent No.: US 6,833,770 B1
(45) Date of Patent: Dec. 21, 2004

(54) CDMA MODULATION METHOD AND DEVICE THEREFOR

(75) Inventors: Shusaku Fukumoto, Higashihiroshima (JP); Takashi Nakai, Chiba (JP); Shunsuke Araki, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/129,789

(22) PCT Filed: Nov. 24, 2000

(86) PCT No.: PCT/JP00/08293

§ 371 (c)(1),
(2), (4) Date: May 10, 2002

(87) PCT Pub. No.: WO01/39387

PCT Pub. Date: May 31, 2001

(30) Foreign Application Priority Data

Nov. 26, 1999 (JP) ............................................ 11/336562

(51) Int. Cl.[7] ............................................. H04L 27/20
(52) U.S. Cl. ...................................... 332/103; 375/146
(58) Field of Search .......................... 332/103; 375/146, 375/135

(56) References Cited

U.S. PATENT DOCUMENTS

| 4,730,340 A | * | 3/1988 | Frazier, Jr. ................... 375/150 |
| 5,103,459 A | | 4/1992 | Gilhousen et al. ............. 375/1 |
| 5,712,869 A | * | 1/1998 | Lee et al. .................... 375/141 |
| 5,940,434 A | | 8/1999 | Lee et al. .................... 375/206 |

FOREIGN PATENT DOCUMENTS

| EP | 0 751 630 A2 | 1/1997 |
| EP | 0 898 393 A2 | 2/1999 |
| EP | 0 921 652 A2 | 6/1999 |
| JP | 11-186989 | 7/1999 |
| JP | 2000-252874 | 9/2000 |
| WO | WO 96/02987 | 2/1996 |
| WO | WO 99/56444 | 11/1999 |
| WO | WO 00/13312 | 3/2000 |

OTHER PUBLICATIONS

Sawahashi et al., *Next Generation Mobile Radio Access for Multimedia Transmission:W–CDMA*, Technical Report of IEICE, SST–98–41, Dec. 1998, pp. 1–8.

Prasad et al., "An Overview of CDMA Evolution Toward Wideband CDMA," IEEE Communications Surveys, Fourth Quarter 1998, vol. 1, No. 1 (pp 2–29).

Yokoyama, *Spread Spectrum Communications Systems*, pp. 471–478, Published by Kagaku Gijutu Shuppansha, May 20, 1998.

Ohno et al., *Mobile Radio Access Based on Wideband Coherent DS–CDMA*, NTT DoCoMo Technical Journal, vol. 4 No. 3, pp. 9–13, Oct. 1996.

Higashi et al., *W–CDMA system Experiment (1): Mobile Station Overview*, NTT DoCoMo Technical Journal vol. 6, No. 3, Special Issue (1), pp. 24–29, Oct. 1998.

* cited by examiner

Primary Examiner—Robert Pascal
Assistant Examiner—Joseph Chang
(74) Attorney, Agent, or Firm—Nixon & Vanderhye PC (57) ABSTRACT

A CDMA complex QPSK spread modulation method and apparatus are provided, which can be operated on a reduced gate scale with reduced power consumption. Digital data signals are spread modulated by multipliers, with the first spreading codes generated from first spreading code generators, so as to produce spread modulated signals. These spread modulated signals are input to a complex QPSK processor where they are subjected to a complex QPSK operation with second spreading codes generated from second spreading code generators. The resultant signals are filtered through low-pass filters. Digital-to-analog converters convert the filtered signals into analog values. Signals including the QCH data signal are processed through multipliers so as to weight them with a gain factor G from a gain factor controller.

20 Claims, 11 Drawing Sheets

CDMA MODULATION METHOD AND DEVICE THEREFOR

This application is the U.S. national phase of international application PCT/JP00/08293 filed Nov. 24, 2000, which designated the U.S.

TECHNICAL FIELD

The present invention relates to a spread modulating method and an apparatus using the method in a spread spectrum communications system and a CDMA (Code Division Multiple Access) system, in particular relating to a CDMA spread modulating method and an apparatus using the method for implementing complex QPSK (Quadrature Phase Shift Keying) spread modulation.

BACKGROUND ART

Spread spectrum communication and CDMA (Code Division Multiple Access) systems using spread spectrum communication technologies are characterized by having strong resistance to multipath fading, capability of enhancing the data rate, excellent communication quality, high efficiency in frequency usage and the like, so that they are attracting the attention as the next-generation mobile communications system and multimedia mobile communications.

In the spread spectrum communication, the signal to be transmitted is spread into a signal having a bandwidth much wider than that of the original signal on the transmission side and is transmitted. On the reception side, the spectrum-spread signal is reverted back into the signal having the original signal bandwidth. The above features are obtained by this feature.

Figure 7:
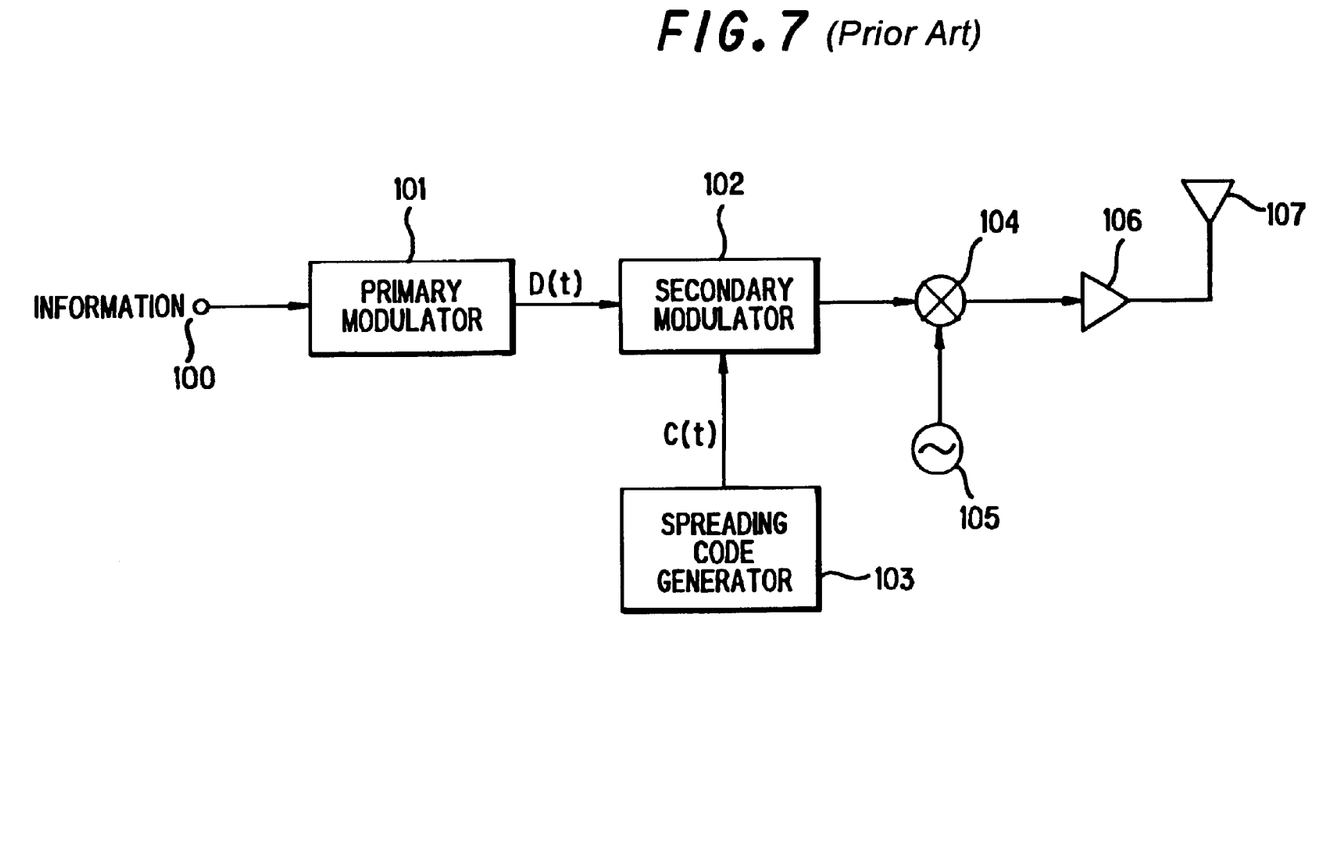
FIG. 7 is a block diagram showing a transmitter in a conventional spread spectrum communications system.

FIG. 7 is a block diagram showing a transmitter in a conventional spectrum spread communications system. Information 100 to be transmitted is processed through a primary modulator 101 into a data signal D(t) such as a data signal which has been modulated by BPSK (Binary Phase Shift Keying), QPSK(Quadrature Phase Shift Keying) or the like. The data signal D(t) is secondarily modulated by a secondary modulator 102 based on a spread spectrum code C(t) generated from a spreading code generator 103. An M-sequence, Goldcode, Hadamard code and other codes can be used as the spreading code C(t). The CDMA system makes distinctions between users, cells, data channels, etc., based on the spreading code C(t) generated from spreading code generator 103. Thereafter, at a multiplier 104, the secondary modulated waveform is multiplied by the carrier wave generated from radio carrier wave generator 105 so that it is transformed into a radio frequency wave. The thus transformed carrier wave (baseband transmission signal) is amplified by an amplifier 106 and sent out from antenna 107.

Figure 8:
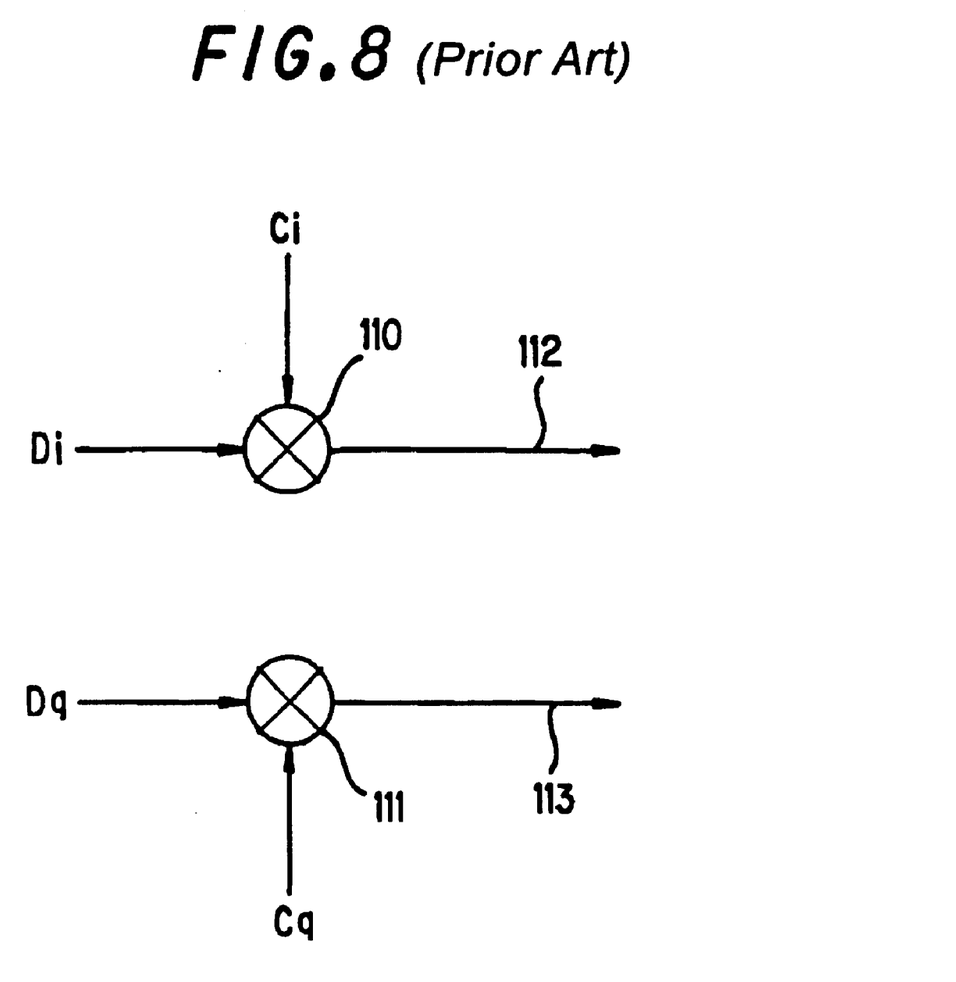
FIG. 8 is a block diagram showing one example of a conventional secondary modulator.

Similarly to the primary modulation there are some techniques such as BPSK, QPSK as the technique for secondary modulation(spread modulation). FIG. 8 is a block diagram showing one example of a conventional secondary modulator. In this secondary modulator, as shown in FIG. 8, data Di and data Dq which are independent from each other on the in-phase channel (ICH) and quadrature channel (QCH) are operated by multipliers 110 and 111 using independent spreading codes Ci and Cq. By this operation, Di·Ci and Dq·Cq are obtained as spread signals 112 and 113, respectively. This technique is called a dual-channel QPSK method, which is effective in transmitting independent data streams in parallel. The spread modulation is described in detail in the following literature:

Literature 1: pp. 471–478 in 'Spread spectrum communications system' written by Mitsuo Yokoyama, published from Kagaku Gijutsu Shuppan-sha.

Figure 9:
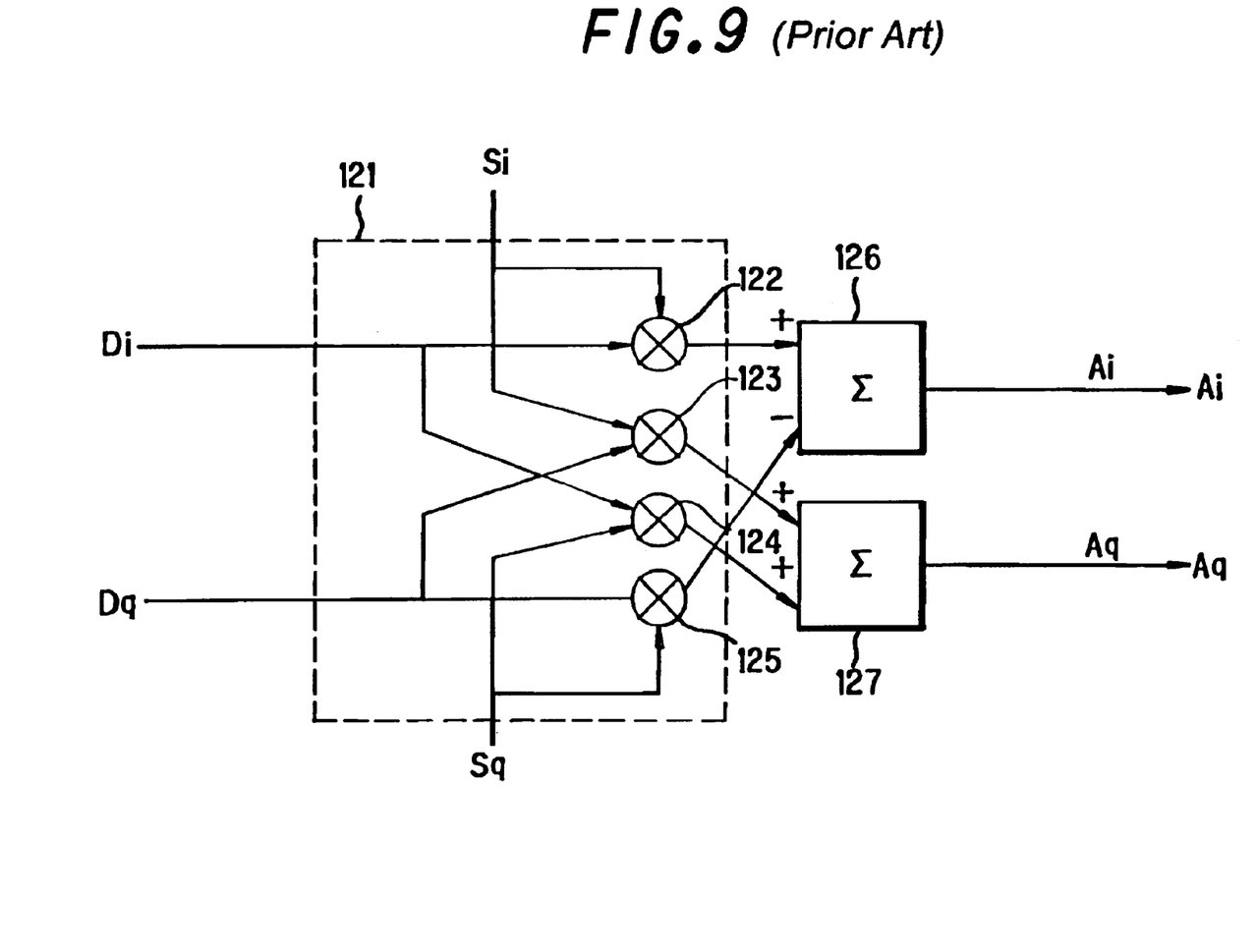
FIG. 9 is a block diagram showing another example of a conventional secondary modulator.

Next, a complex QPSK spread modulating technique which is more complicated will be described. FIG. 9 is a block diagram showing another example of a secondary modulator for implementing the complex QPSK spread modulation. Here, complex data (Di, Dq) is complex-spread in a complex QPSK processor 121 by complex spreading codes (Si, Sq) so as to produce ICH spread signal Ai and QCH spread signal Aq. This complex QPSK modulation is represented by the following equation (1):

$$(Di+jDq)\cdot(Si+jSq)=(Di\cdot Si-Dq\cdot Sq)+j(Di\cdot Sq+Dq\cdot Si)=Ai+jAq \quad (1)$$

where j is an imaginary unit.

In order to produce the terms on the right side of equation (1), a complex QPSK processor 121 implements the operation between complex data (Di, Dq) and complex spreading codes (Si, Sq) by multipliers 122, 123, 124 and 125. As a result, (Di·Si), (Dq·Sq), (Di·Sq) and (Dq·Si) in equation (1) are obtained. Then, the results are summed (subtracted) in adders 126 and 127, taking into account the signs in equation (1).

The W-CDMA (Wideband-CDMA) as a next-generation mobile communications scheme implements spread modulation using two kinds of spreading codes. Specifically, a long code having a markedly long symbol period and short code having a short symbol period are used in combination so as to implement spreading and scrambling. The roles of spread demodulation and spreading codes in the W-CDMA are described in detail in the following literatures:

Literature 2: 'Next Generation Mobile Radio Access for Multimedia transmission: W-CDMA' Sawahashi and Adachi, Technical Report of IEICE, SST-98-41, 1998-12;

Literature 3: 'Mobile Radio Access Based on Wideband Coherent DS-CDMA', Ohno, Sawahashi, Doi, Higashi, NTT DoCoMo Technical Journal, Vol.4No3.

Next, a spread modulating method using two kinds of spreading codes, or of the combination of the double-spreading using (Ci, Cq) in FIG. 8 and the complex QPSK spreading using (Si, Sq) in FIG. 9 will be described. Specifically, data signals (Di, Dq) are subjected first to the double-spreading using the spreading codes (Ci, Cq), and then subjected to the complex QPSK modulation using the spreading codes (Si,Sq). This complex QPSK modulation is represented by equation (2).

$$(Di\cdot C+JDq\cdot Cq)\cdot(Si+JSq)=(Di\cdot Ci\cdot Si-Dq\cdot Cq\cdot Sq)+j(Di\cdot Ci\cdot Sq+Dq\cdot Cq\cdot Si)=Ai+jAq \quad (2)$$

Figure 10:
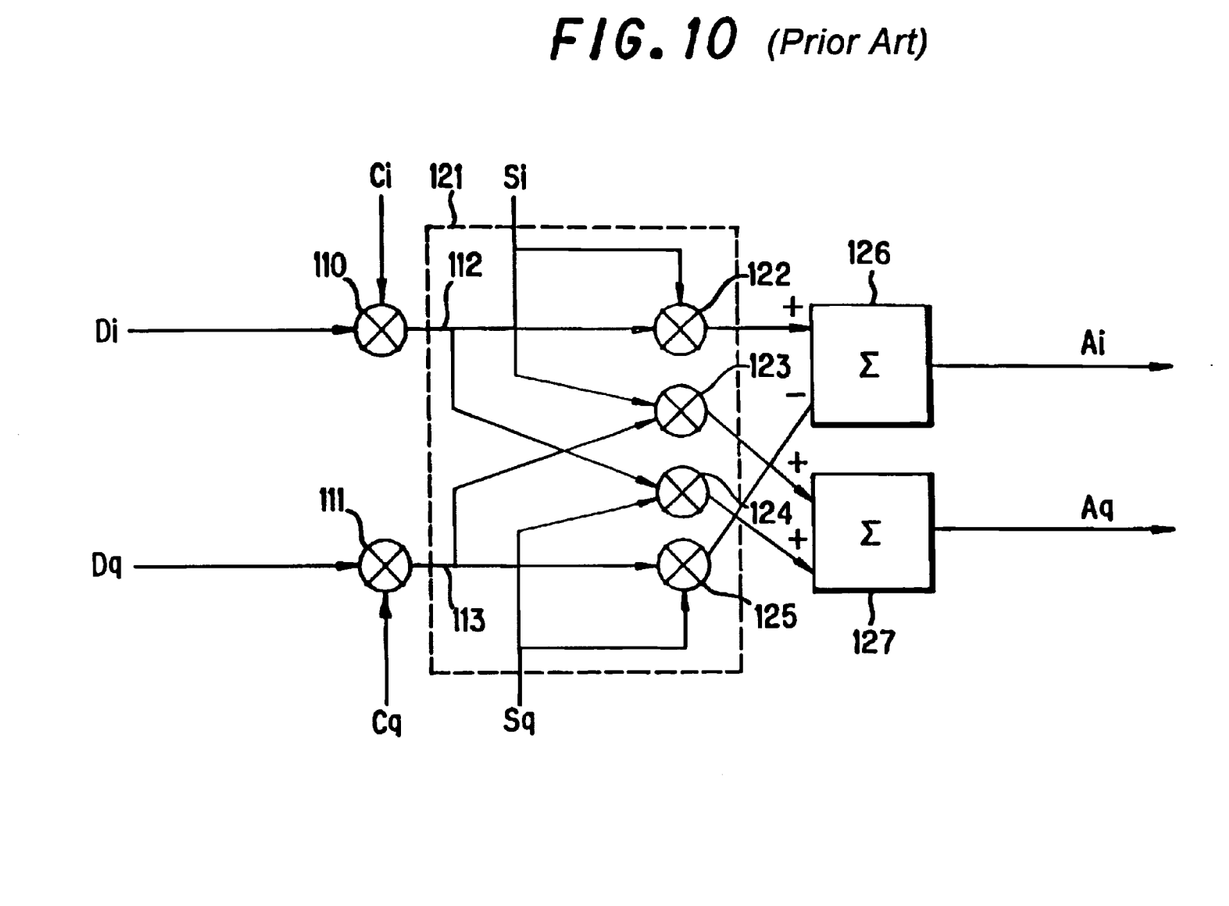
FIG. 10 is a block diagram showing still another example of a conventional secondary modulator.

FIG. 10 is a block diagram showing another example of a secondary modulator for implementing this complex QPSK spread modulating method. In the secondary modulator for implementing this complex QPSK modulation shown in FIG. 10, the data signals (Di, Dq) and spreading codes (Ci, Cq) are double-spread through multipliers 110 and 111. In a complex QPSK processor 121, the signals 112 and 113 having undergone double-spreading are subjected to the complex QPSK spread modulation with the other spreading codes (Si, Sq) and the result is supplied to adder/subtractors 126 and 127 for addition (subtraction).

That is, complex QPSK processor 121, in order to produce the right side terms in equation (2), implements operations between complex data (Di·Ci, Dq·Cq) and complex spreading codes (Si, Sq) using multipliers 122, 123, 124 and 125. From these operations, the terms (Di·Ci·Si), (Dq·Cq·Sq), (Di·Ci·Sq) and (Dq·Cq·Si) in equation (2) are determined.

Here, when the spreading rate (chip rate) of the spreading codes (Ci, Cq) is equal to that of the other spreading codes (Si, Sq), the spreading codes (Si, Sq) provide a scrambling function, so that the spreading codes (Si, Sq) are also called scramble codes.

Figure 11:
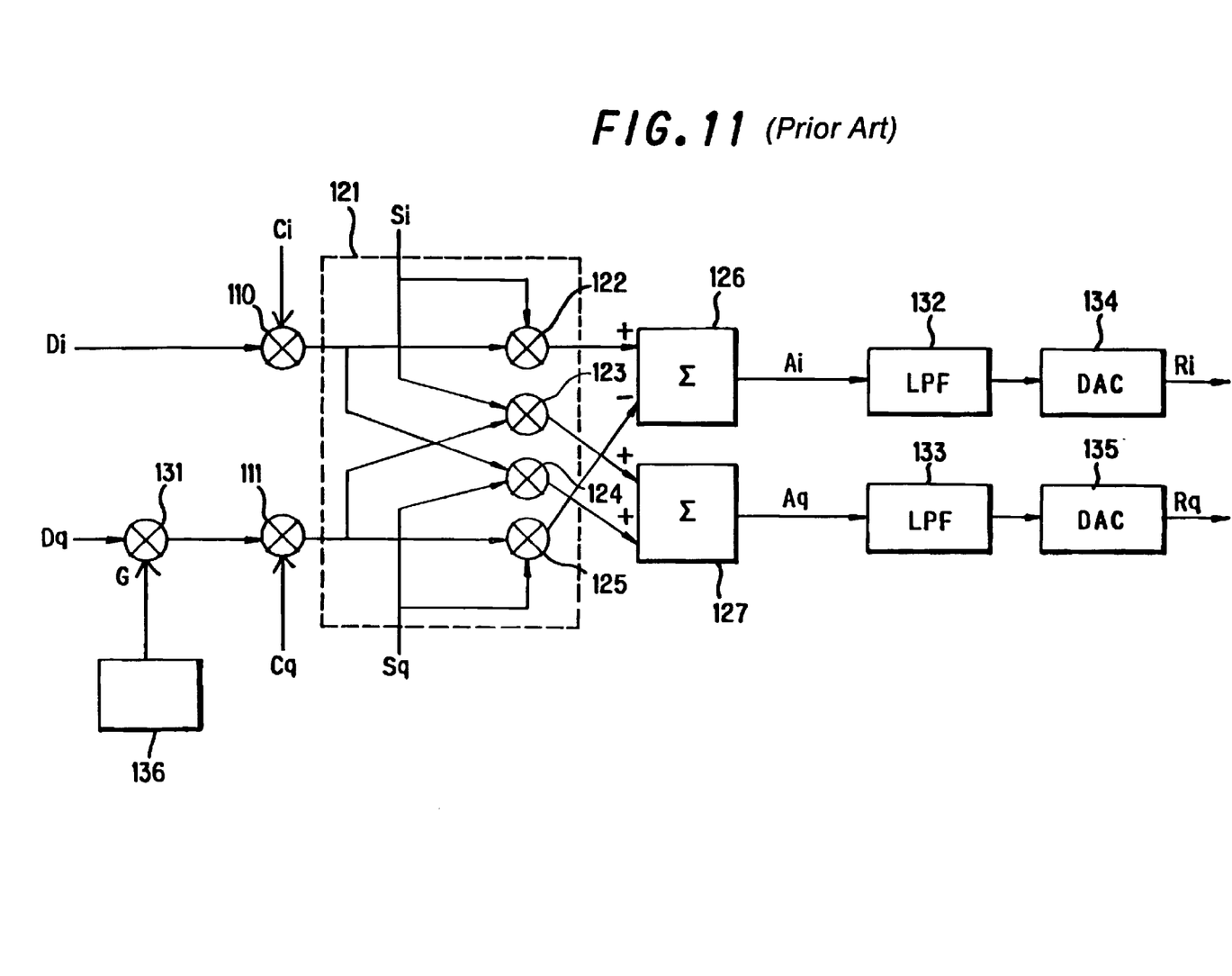
FIG. 11 is a block diagram showing a further example of a conventional secondary modulator.

The data signal (Di, Dq) in FIG. 10 are independent from each other as already mentioned. For example. Di may be allotted for information data to be transmitted and Dq may be allotted for a control signal. In some cases, the information data Di and control data Dq may be adjusted as to their amplitude ratio by a gain factor G, dependent on their signal importance. FIG. 11 is a block diagram showing a secondary modulator in which control signal Dq is adjusted by a gain factor G.

This secondary modulator, as shown in FIG. 11, the quadrature channel data signal Dq is weighted by a multiplier 131 based on the signal of gain factor G generated from a gain factor controller 136. The data signal weighted with the gain factor G, or the data signal (Di, G·Dq) and the spreading codes (Ci, Cq) are double-spread by multipliers 110 and 111, in the same manner as that shown in FIG. 10. Then, the resultant signals are subjected to complex QPSK spread modulation with the other spreading codes (Si, Sq) by means of QPSK processor 121 and adders 126 and 127.

The signals Ai and Ag having undergone complex QPSK modulation are processed through LPFs (low-pass filters) 132 and 133(or root Nyquist filters for suppressing the power leakage to adjacent channels) for limiting the bandwidth of the CDMA transmission signal and are converted into analog signals (Ri. Rq), by means of DACs (digital-to-analog converters) 134 and 135. Thereafter, the analog baseband signal (Ri, Rq) are converted into a radio frequency wave, which is then amplified and sent out as a CDMA signal from the antenna.

In the CDMA complex QPSK spread modulating circuit (secondary modulator) shown in FIG. 11, fine adjustment of the gain factor G for assigning a weight to the digital data needs to allot an increased number of bits for the gain factor G. When the gain factor G is includes, the ICH spreading signal Ai and QCH spreading signal Aq in FIG. 11 are represented as follows:

$$(D_i \cdot C_i + jG \cdot D_q \cdot C_q) \cdot (S_i + jS_q) = (D_i \cdot C_i \cdot S_i - G \cdot D_q \cdot C_q \cdot S_q) + j(D_i \cdot C_i \cdot S_q + G \cdot D_q \cdot C_q \cdot S_i) = A_i + jA_q \quad (3)$$

In equation (3), the terms including G are of multi-bit operations. Therefore, in order to execute the operation of equation (3), the complex QPSK processor 121 in FIG. 11 should implement multi-bit operations. As a result, spreading signals Ai and Aq also have multi-bit values. Accordingly, LPFs (or root Nyquist filters) 132 and 133 should be of a multi-bit weighting digital filter configuration having multi-bit input and multi-bit output. LPFs (or root Nyquist filters) 132 and 133 are strictly limited in the CDMA system in order to suppress the power leakage to adjacent channels. The details are given in the following literature 4. Literature 4: NTT DoCoMo Technical Journal Vol.6No.3 'Special Issue (1) on W-CDMA System Experiment (1): Mobile Station Overview' by Higashi, Tagagi, Yunoki and Takami.

The strict characteristics of LPFs (or root Nyquist filters) 132 and 133 can be achieved by digital filters having many taps with multi-bit weighting. In this way, LPFs (or root Nyquist filters) 132 and 133 need multi-bit input, multi-bit output, multi-bit weighting and many taps, so that there is a problem that the gate scale and its power consumption increase.

The object of the present invention is to provide a CDMA modulating method and an apparatus thereof for implementing CDMA complex QPSK spread modulation, which can be operated on a reduced gate scale with a low power consumption.

DISCLOSURE OF INVENTION

The present invention has the following configurations in order to solve the above problem.

The first invention is a CDMA modulating method for processing in-phase and quadrature channel signals to be transmitted by weighting at least one of the signals by a gain factor, passing the signals obtained by complex QPSK spread modulation based on complex spreading codes through low-pass filtration, subjecting the signals to digital-to-analog conversion so as to produce baseband transmission signals, and is characterized in that the weighting with the gain factor is applied either after the low-pass filtration or the digital-to-analog conversion.

The second invention is a CDMA modulating apparatus comprising: at least one complex spreading code generator; a complex QPSK processor for implementing complex QPSK spread modulation of in-phase and quadrature channel signals to be transmitted, based on complex spreading codes generated from the complex spreading code generator; low-pass filters connected to the signal outputs from the complex QPSK processor; digital-to-analog converters for implementing digital-to-analog conversion of the signals having passed through the low-pass filters; gain factor multipliers for assigning a weight of a gain factor to the terms corresponding to the in-phase channel signal or quadrature channel signal to be transmitted; and adders for summing the weighted signals to produce complex QPSK spread modulated signals, and is characterized in that the gain factor multipliers are arranged downstream of the low-pass filters or digital-to-analog converters.

The third invention is characterized in that the low-pass filters are of a root Nyquist characteristic digital filter configuration having 25 to 40 taps with 5 to 8 bits for weighting coefficient quantization.

The fourth invention is characterized in that when the gain factor is assigned to the digital-to-analog converted, transmission signals, the gain factor is digitally controlled so as to assign the weight on the signals through the digital-to-analog converters.

The fifth invention is characterized in that when respective weights are assigned to the in-phase channel and quadrature channel signals to be transmitted, the gain factor to one of the channel signals is used to normalize the gain factor to the other channel signal, so that gain control is performed on one channel signal only.

The sixth invention is a CDMA modulating apparatus comprising: at least one complex spreading code generator; a gain factor multiplier for assigning a weight of a gain factor to the terms corresponding to the in-phase channel signal or quadrature channel signal to be transmitted; a complex QPSK modulator for implementing complex QPSK spread modulation of the channel signal having passed through the gain factor multiplier and the other channel signal, based on complex spreading codes generated from the complex spreading code generator; adders for summing the outputs from the complex QPSK processor to produce complex QPSK spread modulated signals; low-pass filters receiving the produced complex QPSK spread modulated signals; and digital-to-analog converters for implementing digital-to-analog conversion of the signals having passed through the low-pass filters, and is characterized in that the gain factor is made up of a four bit or greater bit signal The seventh invention is characterized in that the low-pass filters are of a root Nyquist characteristic digital filter configuration having 25 to 40 taps with 5 to 8 bits for weighting coefficient quantization and the number of bits of the digital-to-analog converters is set at 8 to 10.

The CDMA complex QPSK spread modulating apparatus of the present invention implements spreading and scrambling using two kinds of spreading codes. The QCH information data is subjected to dual-channel QPSK spread modulation with a spreading code and then subjected to complex QPSK operation by another spreading code (scramble code). The operational outputs are input to one-bit input root Nyquist filters and then converted by DACs into analog values. The gain factor is analogically operated with the DAC output signals. The DAC output signals are summed appropriately to produce the aimed ICH and QCH transmission baseband signals.

Thus, the gain factor operation, the complex QPSK operating method and the operating techniques and arrangement of the root Nyquist filters and DACs are optimized, whereby CDMA complex QPSK spreading using two kinds of spreading codes based on equation (3) is made possible to be implemented using, the least possible, one-bit signals as the input signals to the complicated root Nyquist filters (digital filters), instead of using multi-bit signals. As a result, it becomes possible to reduce the number of gates required and reduce the power consumption.

BEST MODE FOR CARRYING OUT THE INVENTION

The embodiment of the present invention will be described hereinbelow with reference to the drawings.

Figure 1:
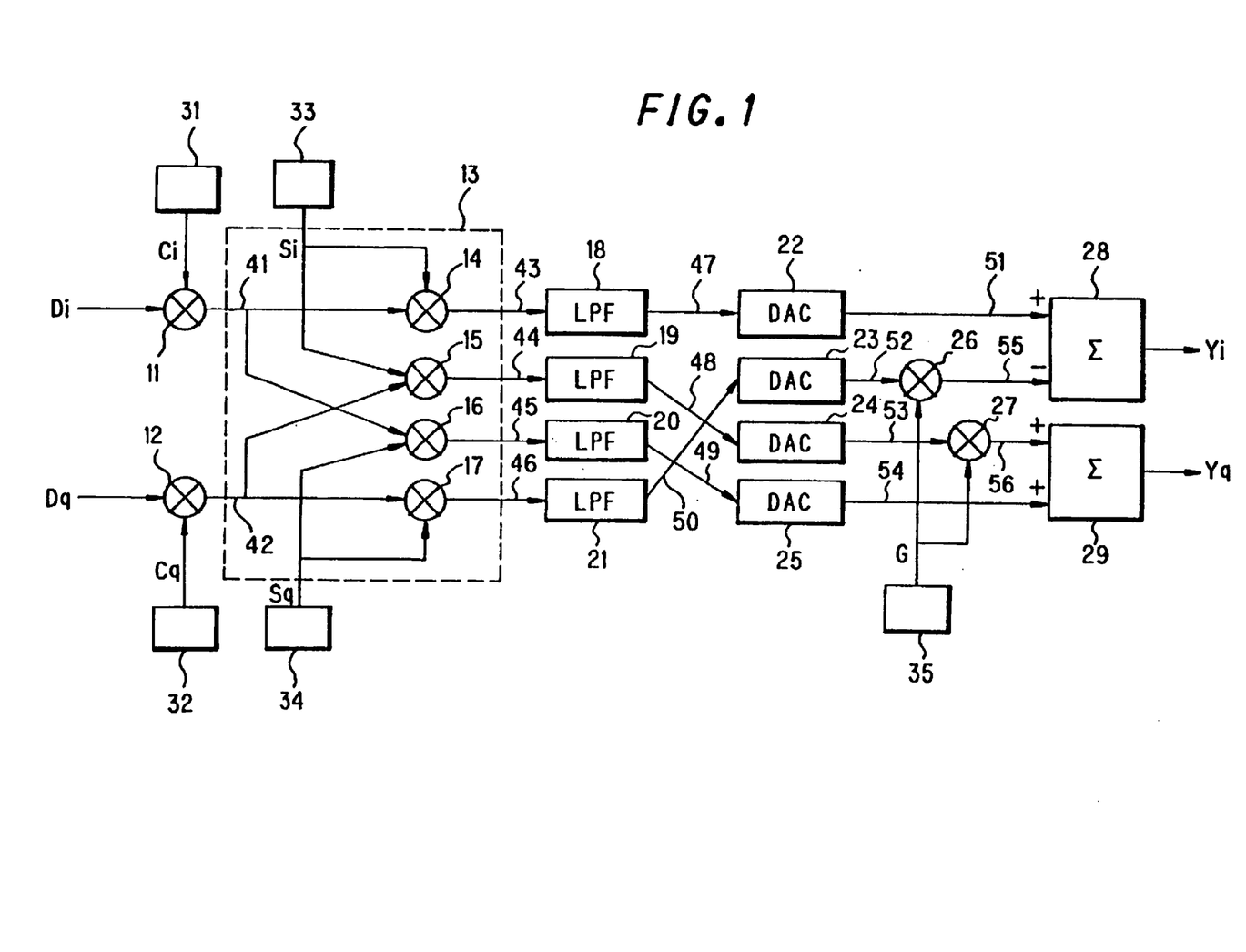
FIG. 1 is a block diagram showing one embodiment of a CDMA modulating circuit according to the present invention.

FIG. 1 is a block diagram showing one embodiment of a CDMA modulating circuit according to the present invention. Input to this CDMA modulating circuit (the secondary modulator in FIG. 7) are digital data signals (Di, Dq). This CDMA modulating circuit is comprised of multipliers 11 and 12, first spreading code generators 31 and 32, second spreading code generators 33 and 34, a complex QPSK processor 13, LPFs (or root Nyquist filters) 18, 19, 20 and 21, DACs (digital to analog converters) 22, 23, 24 and 25, again factor controller 35, weighting multipliers 26 and 27 and adders 28 and 29. Complex QPSK processor 13 includes multipliers 14, 15, 16 and 17.

Independent digital data signals Di and Dq are spread modulated by multipliers 11 and 12, with the first spreading codes Ci and Cq generated from spreading code generators 31 and 32, so as to produce spread modulated signals (Di·Ci) 41 and (Dq·Cq) 42. Spread modulated signals 41 and 42 are input to complex QPSK processor 13 where they are subjected to another complex QPSK operation with the second spreading codes Si and Sq generated from spreading code generators 33 and 34. As a result of the complex QPSK operation with second spreading codes (Si, Sq), the input signals (Di·Ci, Dq·Cq) 41 and 42 to complex QPSK processor 13 are transformed into outputs 43, 44, 45 and 46. The outputs 43, 44. 45 and 46 from the complex QPSK operation correspond to the four terms obtained from the operation of equation (2). That is, as shown in equation (2), the function of the complex QPSK operation provides multiplication between input ICH and QCH signals and the ICH and QCH signals of the spreading codes (scramble codes) so as to produce the four terms (Di·Ci·Si), (Dq·Cq·Sq), (Di·Ci·Sq) and (Dq·Cq·Si).

The signals 43 to 46 corresponding to the above four terms obtained from the complex QPSK operation are filtrated through LPFs 18 to 21 having root Nyquist characteristics to suppress the power leakage to adjacent channels. As a result, digital signals 47, 48, 49 and 50 are obtained. These digital signals 47 to 50 are converted into analog values 51, 52, 53 and 54 by DACs 22 to 25. In order to implement weighting with a gain factor G following equation (3), the signals 44 and 45 corresponding to the terms including the ICH data signal Dq are processed through multipliers 26 and 27 so as to weight them with the gain factor G from gain factor controller 35.

The signals 55 and 56 including the terms corresponding to the data signal Dq weighted by the gain factor G and the data signal 51 and 54 including the terms corresponding to the data signal Di are subjected to addition (subtraction) through adders 28 and 29, taking into account the signs in equation (3). As a result, spread modulated, transmission analog baseband ICH signal Yi and QCH signal Yq are obtained.

Assuming that LPFs (or root Nyquist filters) 132 and 133 and DACs 134 and 135 in FIG. 11 have the same characteristics as LPFs (or root Nyquist filters) 18 to 21 and DACs 22 to 25, apparently the analog baseband signal Yi is equal to Ri and Yq is equal to Rq, so that the configuration of the present invention shown in FIG. 1 can realize the CDMA complex QPSK spread modulation including the gain factor G.

In the complex QPSK processor 13 in FIG. 1, since input signals Di and Dq, first spreading codes Ci and Cq and second spreading codes Si and Sq are all one-bit digital signals, the output signals 43, 44, 45 and 46 having passed through multipliers 11, 12, 14, 15, 16 and 17 are all one-bit digital signals. Therefore, the inputs to the next LPFs 18 to 21 are all one-bit digital signals. In sum, differing from the conventional configuration shown in FIG. 11 where the LPFs 132 and 133 handles multi-bit input, LPFs 18 to 21 handles one-bit input. Therefore, a remarkable reduction in gate scale accompanying with a reduction in power consumption can be expected.

Next, whether the present invention can actually provide the above effect, compared with the conventional configuration, will be examined.

Figure 2:
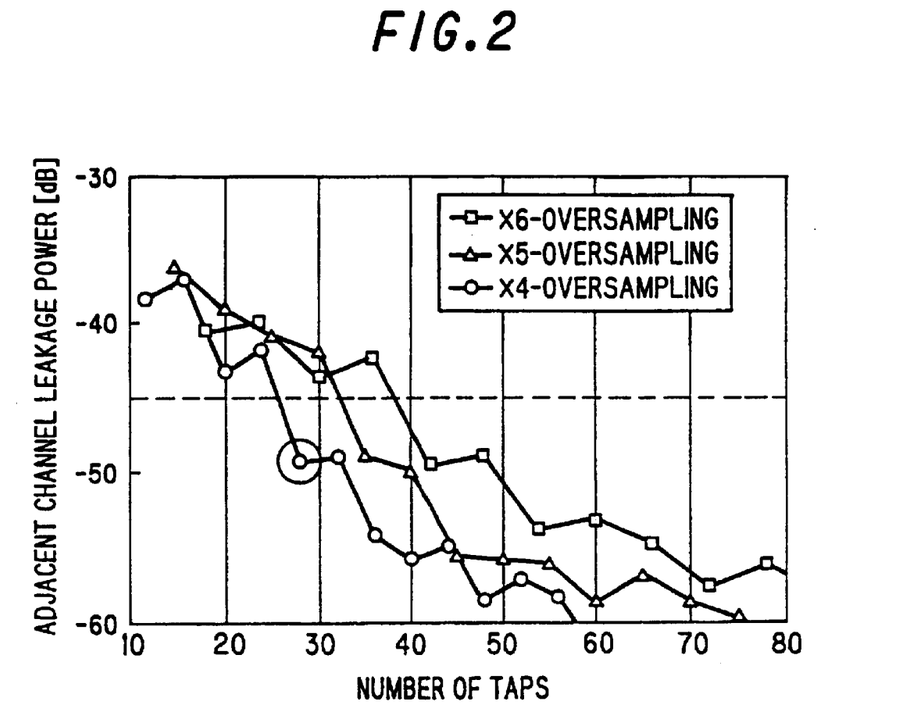
FIG. 2 is a graph showing the relationship between the number of taps and the adjacent channel leakage power when the oversampling rate is varied as a parameter.
Figure 3:
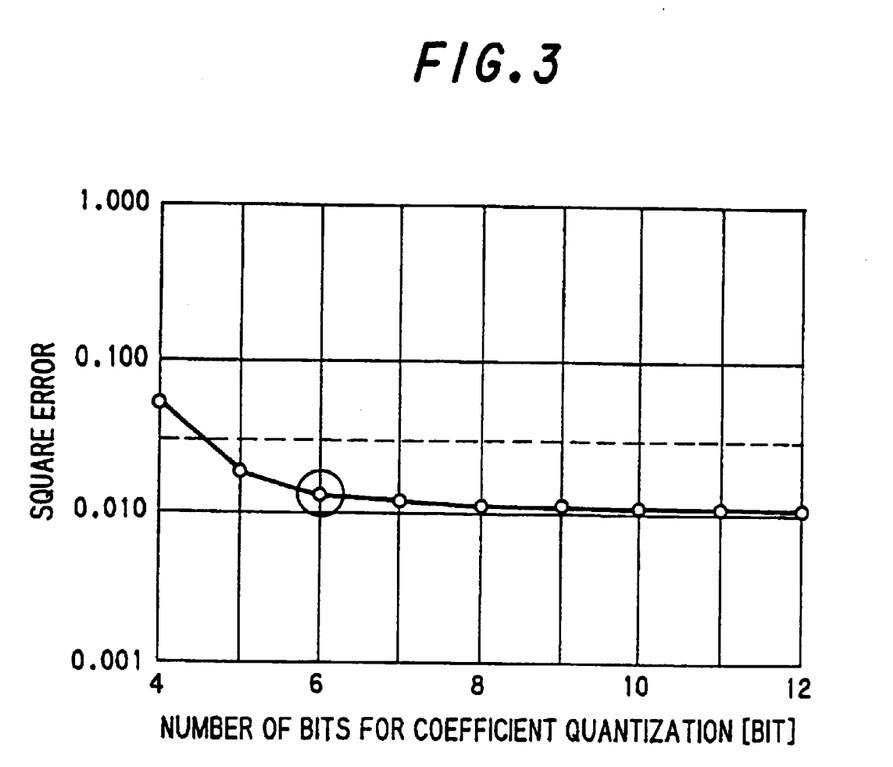
FIG. 3 is a graph showing the relationship between the square error and the number of bits for weighting coefficient quantization of a root Nyquist filter.
Figure 4:
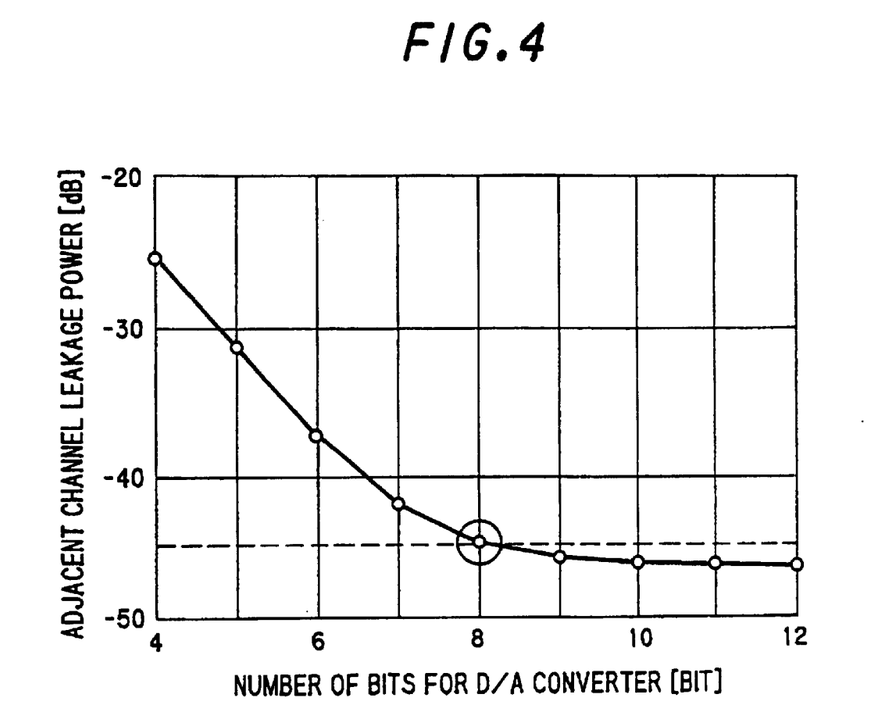
FIG. 4 is a graph showing the relationship between the required number of bits for digital-to-analog converts and the adjacent channel leakage power.

In order to compare the number of the gates in the LPFs of the CDMA modulating circuit shown in FIG. 1 with that shown in FIG. 11, the characteristics of the fundamental LPF and DAC should be evaluated. Specifically, the number of taps required for one LPF (root Nyquist filter), the number of bits for weighting coefficient quantization and the number of bits for one DAC, which meet the requirement of the adjacent channel leakage power characteristic, should be determined. The adjacent channel leakage power characteristic is assumed to be −45 dB/4.096 MHz (when detuning 5 MHz), in reference to the literature 4. FIGS. 2, 3 and 4 show the results of calculation as to the conditions of the adjacent channel leakage power characteristic with respect to the required number of taps as a parameter of the LPF, the number of bits for quantization and the required number of bits for one DAC, respectively.

FIG. 2 shows the relationship between the required number of taps and the adjacent channel leakage power when the oversampling rate is varied as a parameter, and the results are shown with the oversampling rate set at 4, 5 and 6 times. As understood from FIG. 2, the leakage power characteristic is greatly affected by the number of taps. On the other hand, when considering that as the number of taps increases, so does the number of gates, to meet the aforementioned condition relating to the adjacent channel leakage power characteristic, the number of taps should be set at 25 to 40. The number of taps is most preferably 28, when taking into account some margin.

FIG. 3 shows the relationship between the square error and the number of bits for weighting coefficient quantization of the root Nyquist filter. In order to reduce the number of gates, it is necessary to lessen the number of bits to as low as possible. However, as understood from FIG. 3, 5 to 8 bits are needed for the quantization. Since the square error characteristic begins to become saturated from the range of 7 to 8 bits or greater, 8 bit quantization is high enough and 6 bit quantization is particularly preferred.

FIG. 4 shows the relationship between the required number of bits for the DACs 22 to 25 at the subsequent step and the adjacent channel leakage power, and 7 to 10 bits are needed. The leakage power characteristic is largely affected by the number of bits when it is equal to 8 bits or lower and becomes saturated when it is 9 or 10 or greater. The number of bits is preferably set at 8 or 10 when taking these facts into account.

Since the LPFs (root Nyquist filters) are provided in a digital filter configuration, the number of gates which determines the power consumption in the filter portion can be estimated by determining the above parameters and the number of input bits to each LPF (root Nyquist filter). The number of input bits to the LPF(root Nyquist filter) differs depending on the configuration, either that shown in FIG. 11 or that shown in FIG. 1. In the configuration shown in FIG. 11, the number of input bits is determined by the gain factor G while the input is of a single bit in the configuration shown in FIG. 1.

In general, when the semiconductor process is assumed to be uniform for digital circuits, the power consumption increases in proportion to the operating frequency and the number of gates. Particularly, since the next-generation mobile communication needs not only to handle sound but also multimedia data, the operating frequency becomes higher. Accordingly, it is markedly important to reduce the number of gates in the digital portion to as low as possible.

Figure 5:
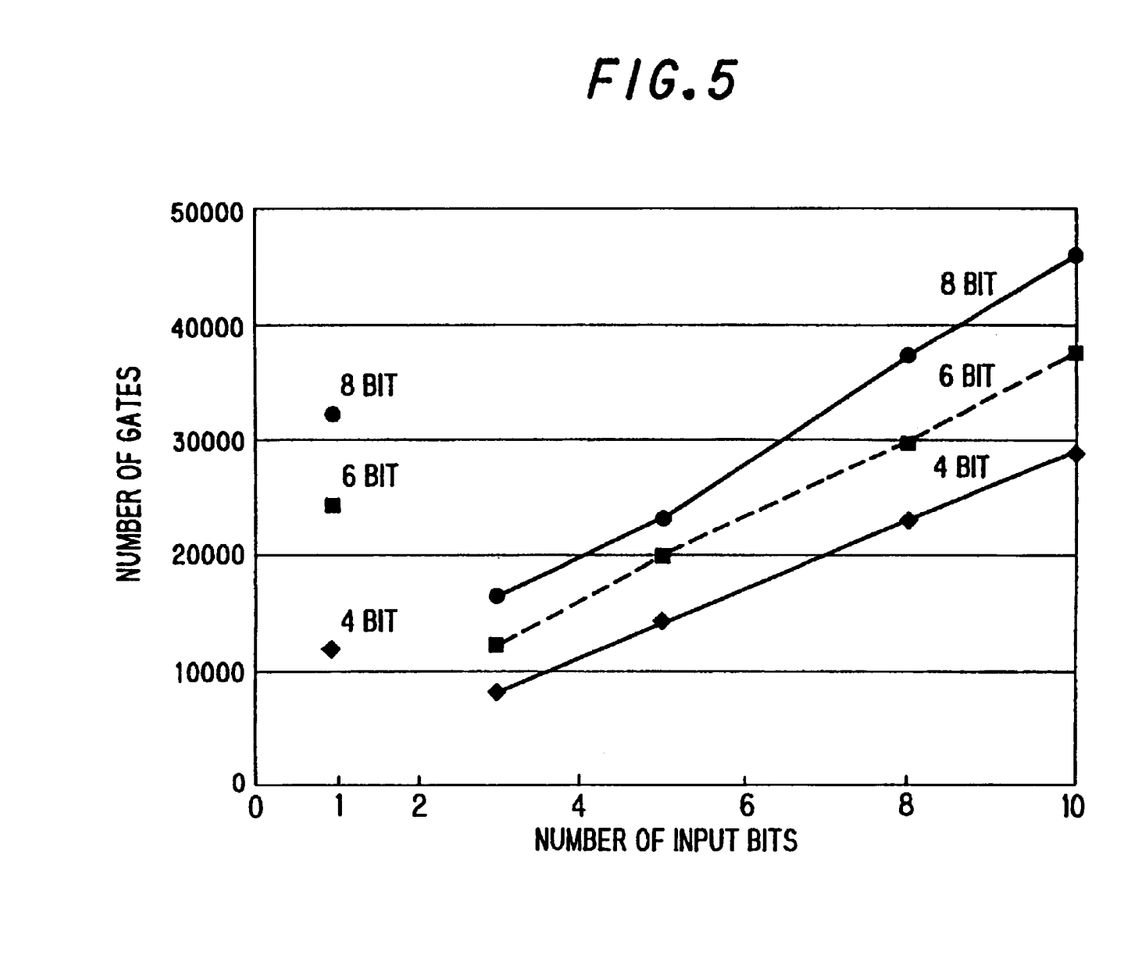
FIG. 5 is a graph showing the relationship between the number of gates of root Nyquist filters and the number of input bits.

FIG. 5 shows the number of gates of all the LPFs (root Nyquist filters) depending on the number of bits for weighting coefficient quantization and the number of input bits to each LPF (root Nyquist filter) when the number of taps in the LPF (root Nyquist filter) is set at 28 as stated above.

In FIG. 5, the points where the number of input bits is set at 1 represent the characteristic of the LPFs in the configuration shown in FIG. 1. The inputs to the four LPFs (root Nyquist filters) 18 to 21 are of a single bit while the numbers of gates are shown in relation to the number of bits (4, 6 and 8 bits) for weighting coefficient quantization. In FIG. 5, the points where the number of input bits is set at 3, 5, 8 and 10 represent the characteristic of the LPFs in the configuration shown in FIG. 11. The number of gates of all the two root Nyquist filters is shown by changing the number of bits for weighting coefficient quantization as a parameter (4, 6 and 8 bits).

The number of gates of the LPFs (root Nyquist filters) in FIG. 1 becomes smaller than the number of gates in FIG. 11 in the following cases. In the modulating circuit having the configuration shown in FIG. 11, the number of input bits to the LPF (root Nyquist filter) is determined dependent on the gain factor G. Therefore, it is understood from FIG. 5 that when the number of bits of weighting in the LPFs (root Nyquist filters) is set at 4, the number of gates becomes smaller in the LPFs (each having a one-bit input) in FIG. 1 if the number of input bits to the LPF in FIG. 11 or the gain factor G is equal to four or greater. When the number of bits of weighting is set at 6 or 8, the number of gates becomes smaller in the LPFs (each having a one-bit input) in FIG. 1 if the number of input bits to the LPF in FIG. 11 or the gain factor G is equal to six or greater. It should be noted that in FIG. 5, the estimate of the number of gates may vary more or less depending on the circuit configuration.

In contrast, when the number of input bits to the LPF in FIG. 11 or the gain factor G is about 4 bits or smaller whereas the LPF in FIG. 1 has 25 to 40 taps with a weighting coefficient of 5 to 8 bits and the number of bits for the DAC (or the number of bits output from the filter) is of a 8 to 10 bit signal, the conventional configuration shown in FIG. 11 becomes smaller in number of gates.

Figure 6:
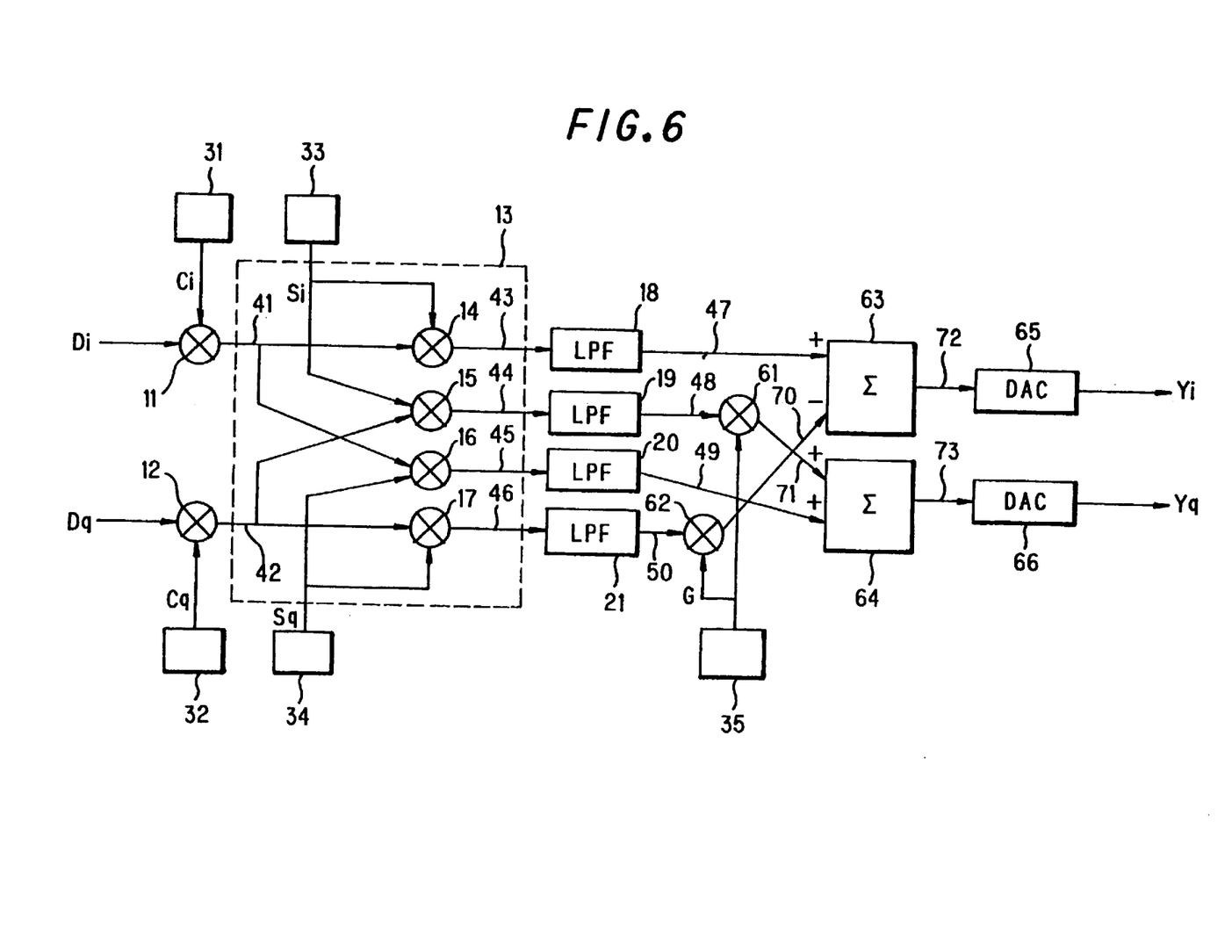
FIG. 6 is a block diagram showing another embodiment of a CDMA modulating circuit according to the present invention.

FIG. 6 shows another embodiment of the present invention. In FIG. 6, input to the CDMA complex QPSK spread modulating circuit are digital data signals (Di, Dq). This circuit is comprised of first spreading code generators 31 and 32, second spreading code generators 33 and 34, a complex QPSK processor 13, LPFs (or root Nyquist filters) 18 to 21, a gain factor controller 35, weighting multipliers 61 and 62, adders 63 and 64 and DACs 65 and 66.

Independent digital data signals Di and Dq are spread modulated by multipliers 11 and 12, with the first spreading codes Ci and Cq generated from spreading code generators 31 and 32, so that spread modulated signals (Di·Ci) 41 and (Dq·Cq) 42 are produced. Spread modulated signals 41 and 42 are input to complex QPSK processor 13 where they are subjected to the complex QPSK operation with the second spreading codes Si and Sq generated from spreading code generators 33 and 34. As a result of the complex QPSK operation with second spreading codes (Si, Sq), the input signals (Di·Ci, Dq·Cq) 41 and 42 to complex QPSK processor 13 are transformed into outputs 43 to 46. The outputs 43 to 46 from the complex QPSK operation correspond to the four terms obtained from the operation of equation (2).

That is, the function of the complex QPSK operation provides multiplication between input ICH and QCH signals and the ICH and QCH signals of the spreading codes (scramble codes) so as to determine the above four terms, shown in equation (2).

The signals 43 to 46 corresponding to the above four terms are filtrated through LPFs 18 to 21 having root Nyquist characteristics to suppress the power leakage to adjacent channels. As a result, digital signals 47 to 50 are obtained. In order to implement weighting with a gain factor G following equation (3), the signals 48 and 50 corresponding to the terms including the ICH data signal Dq are processed through multipliers 61 and 62 so as to weight them with the gain factor G from a gain factor controller 35. The signals 70 and 71 including the terms corresponding to the data signal Dq weighted by the gain factor G and the signals 47 and 49 including the terms corresponding to the data signal Di are subjected to addition (subtraction) through adders 63 and 64, taking into account the signs in equation (3). As a result, spread modulated, transmission baseband ICH digital signal 72 and QCH digital signal 73 are obtained.

The spread modulated, transmission baseband ICH digital signal 72 and QCH digital signal 73 are converted by DACs 65 and 66 into spread modulated, transmission baseband analog signals.

The scheme described with reference to FIG. 6 has the advantage of needing fewer DACs than the configuration of FIG. 1, yet having the effect of the above invention shown in FIG. 1.

Though, in the CDMA complex QPSK spread modulating apparatus shown in FIGS. 1, 11 and 6, two kinds of spreading codes are used to implement spreading and scrambling, it is obvious that the same effect can be obtained using one kind of spreading codes only. That is, it is not necessary that the input signals to the complex QPSK processor 13 should be always spread modulated, but the present invention effectively functions for data signals (Di, Dq) or data signals (Di, GDq) which involve a gain factor G.

Though the gain factor G is applied to the quadrature channel signal in the above description, the gain factor can be applied to the in-phase channel signal or gain factors maybe applied to the in-phase channel signal and the quadrature channel signal. In this case, the same effect can be obviously obtained by normalizing the signals based on the gain factor applied to the in-phase channel.

Industrial Applicability

As has been described, since the present invention adopts a root Nyquist filter configuration and a complex QPSK spread modulating scheme by taking into account the adjacent channel leakage power characteristic and the gain factor, this invention is able to reduce the gate scale and hence the power consumption, so is suitably applied to CDMA mobile communications systems and the like.

What is claimed is:

1. A CDMA modulating method for processing in-phase and quadrature channel signals to be transmitted by weighting at least one of the signals by a gain factor, passing the signals obtained by complex QPSK spread modulation based on complex spreading codes through low-pass filtration, subjecting the signals to digital-to-analog conversion so as to produce baseband transmission signals, wherein the weighting with the gain factor is applied either after the low-pass filtration or the digital-to-analog conversion.

2. A CDMA modulating apparatus comprising:
at least one complex spreading code generator;
a complex QPSK processor for implementing complex QPSK spread modulation of in-phase and quadrature channel signals to be transmitted, based on complex spreading codes generated from the complex spreading code generator;
low-pass filters connected to the signal outputs from the complex QPSK processor;
digital-to-analog converters for implementing digital-to-analog conversion of the signals having passed through the low-pass filters;
gain factor multipliers for assigning a weight of a gain factor to the terms corresponding to the in-phase channel signal or quadrature channel signal to be transmitted; and
adders for summing the weighted signals to produce complex QPSK spread modulated signals,
wherein the gain factor multipliers are arranged downstream of the low-pass filters or digital-to-analog converters.

3. The CDMA modulating apparatus according to claim 2, wherein the low-pass filters are of a root Nyquist characteristic digital filter configuration having 25 to 40 taps with 5 to 8 bits for weighting coefficient quantization.

4. The CDMA modulating apparatus according to claim 2 or 3 wherein when the gain factor is assigned to the digital-to-analog converted, transmission signals, the gain factor is digitally controlled so as to assign the weight on the signals through the digital-to-analog converters.

5. The CDMA modulating apparatus according to claim 2, wherein when respective weights are assigned to the in-phase channel and quadrature channel signals to be transmitted, the gain factor to one of channel signals is used to normalize the gain factor to the other channel signal, so that gain control is performed on one channel signal only.

6. A spread modulating method for use in a CDMA modulating method, the spread modulating method comprising:
spread modulating each of an in-phase channel data signal and a quadrature channel data signal by a respective first-stage spreading code to obtain a spread modulated in-phase channel data signal and a spread modulated quadrature channel data signal;
multiplying the spread modulated in-phase channel data signal and the spread modulated quadrature channel data signal by a first second-stage spreading code to obtain two respective output signals;
multiplying the spread modulated in-phase channel data signal and the spread modulated quadrature channel data signal by a second second-stage spreading code to obtain another two respective output signals;
subjecting the four output signals to respective low-pass filtering; and
subjecting the four filtered output signals to respective digital-to-analog conversion to produce baseband transmission signals, wherein
those output signals corresponding to at least one of the in-phase channel data signal and the quadrature channel data signal are weighted with a gain factor either after the low-pass filtering or after the digital-to-analog conversion.

7. The spread modulating method according to claim 6, wherein the in-phase channel data signal, the quadrature channel data signal, the first-stage spreading codes, the first and second second-stage spreading codes and the four output signals are one-bit digital signals.

8. The spread modulating method according to claim 6, wherein the low-pass filtering corresponds to filtering via a root Nyquist characteristic digital filter configuration having 25 to 40 taps with 5 to 8 bits for weighting coefficient quantization.

9. The spread modulating method according to claim 6, wherein the weighting is effected during the digital-to-analog conversion.

10. The spread modulating method according to claim 6, wherein when respective weights are to be assigned to the in-phase channel data signal and the quadrature channel data signal, the gain factor to one of the channel signals is used to normalize the gain factor to the other channel signal, so that gain control is performed on one channel only.

11. A spread modulating apparatus for use in a CDMA modulating apparatus, the spread modulating apparatus comprising:

a first spread modulating portion for spread modulating each of an in-phase channel data signal and a quadrature channel data signal by a respective first-stage spreading code to obtain a spread modulated in-phase channel data signal and a spread modulated quadrature channel data signal;

a second spread modulating portion for multiplying the spread modulated in-phase channel data signal and the spread modulated quadrature channel data signal by a first second-stage spreading code to obtain two respective output signals;

a third spread modulating portion for multiplying the spread modulated in-phase channel data signal and the spread modulated quadrature channel data signal by a second second-stage spreading code to obtain another two respective output signals;

a low-pass filtering portion for subjecting the four output signals to respective low-pass filtering;

a digital-to-analog converting portion for subjecting the four filtered output signals to respective digital-to-analog conversion to produce baseband transmission signals; and a gain factor weighting portion for weighting those output signals corresponding to at least one of the in-phase channel data signal and the quadrature channel data signal with a gain factor either after the low-pass filtering or after the digital-to-analog conversion.

12. The spread modulating apparatus according to claim 11, wherein the in-phase channel data signal, the quadrature channel data signal, the first-stage spreading codes, the first and second second-stage spreading codes and the four output signals are one-bit digital signals.

13. The spread modulating apparatus according to claim 11, wherein the low-pass filtering corresponds to filtering via a root Nyquist characteristic digital filter configuration having 25 to 40 taps with 5 to 8 bits for weighting coefficient quantization.

14. The spread modulating apparatus according to claim 11, wherein the weighting is effected during the digital-to-analog conversion.

15. The spread modulating apparatus according to claim 11, wherein when respective weights are to be assigned to the in-phase channel data signal and the quadrature channel data signal, the gain factor to one of the channel signals is used to normalize the gain factor to the other channel signal, so that gain control is performed on one channel only.

16. A CDMA modulating apparatus for processing first and second signals to be transmitted by weighting at least one of the signals by a gain factor, the apparatus comprising:

a complex QPSK spread modulator for spread modulating the first and second signals based on spreading codes;

low pass filters for filtering the spread-modulated first and second signals;

digital-to-analog converters for converting the signals output by the low-pass filters to analog signals; and a gain factor multiplier circuit arranged to apply a gain factor either to the signals output by the low-pass filters or to the signals output by the digital-to-analog converters.

17. The CDMA modulating apparatus according to claim 16, wherein the first and second signals comprise an in-phase channel signal and a quadrature channel signal, respectively.

18. The CDMA modulating apparatus according to claim 16, further comprising:

a spreading code generator for generating the spreading codes.

19. A CDMA modulating apparatus for processing first and second signals to be transmitted by weighting at least one of the signals by a gain factor, the apparatus comprising:

means for spread modulating the first and second signals based on spreading codes;

means for low-pass filtering the spread-modulated first and second signals;

digital-to-analog converting means for digital-to-analog converting the signals output by the means for low-pass filtering; and a gain factor multiplier means for applying a gain factor either to the signals output by the means for low-pass filtering or to the signals output by the digital-to-analog converting means.

20. A spread modulating apparatus for use in a CDMA modulating apparatus, the spread modulating apparatus comprising:

spread modulating means for spread modulating each of an in-phase channel data signal and a quadrature channel data signal by a respective first-stage spreading code to obtain a spread modulated in-phase channel data signal and a spread modulated quadrature channel data signal;

first multiplying means for multiplying the spread modulated in-phase channel data signal and the spread modulated quadrature channel data signal by a first second-stage spreading code to obtain first and second output signals;

second multiplying means for multiplying the spread modulated in-phase channel data signal and the spread modulated quadrature channel data signal by a second second-stage spreading code to obtain third and fourth output signals;

low-pass filtering means for low-pass filtering the first, second, third and fourth output signals;

digital-to-analog converting means for digital-to-analog converting the filtered output signals to produce baseband transmission signals; and gain factor weighting means for weighting at least those output signals corresponding to the in-phase channel data signal and the quadrature channel data signal with a gain factor either after the low-pass filtering or after the digital-to-analog converting.

* * * * *